(12) United States Patent
Du et al.

(10) Patent No.: US 9,659,233 B2
(45) Date of Patent: May 23, 2017

(54) METHOD AND APPARATUS FOR DETECTING SALIENT REGION OF IMAGE

(71) Applicant: Huawei Technologies Co., Ltd., Shenzhen, Guangdong (CN)

(72) Inventors: Xinyu Du, Beijing (CN); Dong Wang, Shenzhen (CN); Zichen Gu, Beijing (CN); Daiyu Wei, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 183 days.

(21) Appl. No.: 14/581,418

(22) Filed: Dec. 23, 2014

(65) Prior Publication Data

US 2015/0227816 A1  Aug. 13, 2015

(30) Foreign Application Priority Data

Feb. 10, 2014  (CN) .......................... 2014 1 0046715

(51) Int. Cl.
  *G06K 9/62* (2006.01)
  *G06K 9/46* (2006.01)
  (Continued)

(52) U.S. Cl.
  CPC ............ *G06K 9/623* (2013.01); *G06K 9/4623* (2013.01); *G06K 9/4642* (2013.01); *G06K 9/4652* (2013.01); *G06K 9/481* (2013.01); *G06K 9/6256* (2013.01); *G06K 9/66* (2013.01); *G06K 9/80* (2013.01); *G06T 2207/10024* (2013.01);
  (Continued)

(58) Field of Classification Search
  None
  See application file for complete search history.

(56) References Cited

U.S. PATENT DOCUMENTS

| | | | |
|---|---|---|---|
| 8,401,292 B2 * | 3/2013 | Park ..................... | G06K 9/4671 382/173 |
| 9,330,334 B2 * | 5/2016 | Lin ....................... | G06K 9/4671 |

(Continued)

FOREIGN PATENT DOCUMENTS

EP  2431919 A1  3/2012

OTHER PUBLICATIONS

Deepika Gupta et al, Hybrid Feature based Natural Scene Classification using Neural Network, International Journal of Computer Applications (0975-8887) vol. 41—No. 16, Mar. 2012.*

(Continued)

*Primary Examiner* — Iman K Kholdebarin
(74) *Attorney, Agent, or Firm* — Blakely, Sokoloff, Taylor & Zafman LLP

(57) ABSTRACT

The present invention provides a method and an apparatus for detecting a salient region of an image. Classification processing is obtained by means of pre-training, so as to obtain a classification label, where the classification label is used to indicate a salience detection algorithm for detecting a salient region of the test image. Salience detection is performed on the test image by using the salience detection algorithm indicated by the classification label, so as to obtain the salient region of the test image. Because a salience detection algorithm with the best detection effect is acquired by using the image feature vector of the test image, to detect the salient region of the test image, accuracy of salience detection is improved.

15 Claims, 4 Drawing Sheets

(51) Int. Cl.
G06K 9/80 (2006.01)
G06K 9/48 (2006.01)
G06K 9/66 (2006.01)

(52) U.S. Cl.
CPC .............. *G06T 2207/20081* (2013.01); *G06T 2207/20164* (2013.01)

(56) References Cited

U.S. PATENT DOCUMENTS

| | | | | |
|---|---|---|---|---|
| 2004/0125877 | A1* | 7/2004 | Chang | G06F 17/30787 375/240.28 |
| 2008/0304740 | A1* | 12/2008 | Sun | G06K 9/3233 382/168 |
| 2012/0063641 | A1* | 3/2012 | Venkatesh | G06K 9/00771 382/103 |
| 2012/0275701 | A1* | 11/2012 | Park | G06K 9/4671 382/173 |
| 2012/0294514 | A1* | 11/2012 | Saunders | H04N 1/00196 382/159 |
| 2014/0036054 | A1* | 2/2014 | Zouridakis | G06T 7/0012 348/77 |
| 2014/0250120 | A1* | 9/2014 | Mei | G06F 3/0488 707/736 |
| 2015/0227816 | A1* | 8/2015 | Du | G06K 9/4642 382/156 |
| 2016/0063734 | A1* | 3/2016 | Divakaran | G06K 9/6202 382/110 |

OTHER PUBLICATIONS

Gupta et al., "Hybrid Feature based Natural Scene Classification using Neural Network," International Journal of Computer Applications (0975-8887), vol. 41, No. 16, Foundation of Computer Science, New York, New York (Mar. 2012).

Zang, "Neural Networks for Classification: A Survey," IEEE Transactions on Systems, Man, and Cybernetics-Part C: Applications and Reviews, vol. 30, No. 4, Institute of Electrical and Electronics Engineers, New York, New York (Nov. 2000).

Bianco et al., "Improving Color constancy Using Indoor-Outdoor Image Classification," IEEE Transactions on Image Processing, vol. 17, No. 12, Institute of Electrical and Electronics Engineers, New York, New York (Dec. 2008).

Borji, "Quantitative Analysis of Human-Model Agreement in Visual Saliency Modeling: A Comparative Study," IEEE Transactions on Image Processing, vol. 22, No. 1, Institute of Electrical and Electronics Engineers, New York, New York (Jan. 2013).

Szummer et al., "Indoor-Outdoor Image Classification," IEEE International Workshop on Content-Based Access of Image and Video Database, Institute of Electrical and Electronics Engineers, New York, New York (Jan. 3, 1998).

Borji et al., "State-of-the-Art in Visual Attention Modeling," IEEE Transactions on Pattern Analysis and Machine Intelligence, vol. 35, No. 1, pp. 185-207, Institute of Electrical and Electronic Engineers, New York, New York (Jan. 2013).

* cited by examiner

METHOD AND APPARATUS FOR DETECTING SALIENT REGION OF IMAGE

CROSS-REFERENCE TO RELATED APPLICATIONS

This application claims priority to Chinese Patent Application No. 201410046715.0, filed on Feb. 10, 2014, which is hereby incorporated by reference in its entirety.

TECHNICAL FIELD

Embodiments of the present invention relate to an image processing technology, and in particular, to a method and an apparatus for detecting a salient region of an image.

BACKGROUND

Salience of an image is a critical visual feature of the image and reflects an eye's emphasis on some regions of the image. In an image processing process, a salience detection algorithm usually needs to be used for detecting the image, so as to obtain a salient region of the image, and is mainly applied in photographing software of a mobile phone, object detection software, and image compression software.

In the prior art, there exists a manner of detecting a salient region of an image based on a salience detection algorithm of a low-layer visual feature, so as to obtain the salient region of the image. The algorithm is a selective attention algorithm that simulates a visual attention mechanism of living beings. In addition, in the prior art, there also exists a manner of detecting a salient region of an image according to a pure mathematical calculation method that is not based on any visual principle of living beings, so as to obtain the salient region of the image. However, both of the foregoing two manners have a low accuracy of salient region detection. Therefore, how to improve accuracy in detecting a salient region of an image is a technical problem that urgently needs to be solved currently.

SUMMARY

Embodiments of the present invention provide a method and an apparatus for detecting a salient region of an image, so as to improve accuracy of salient region detection.

A first aspect provides a method for detecting a salient region of an image, including:

performing classification processing on a test image according to an image feature vector of the test image by using a classifier obtained by means of pre-training, so as to obtain a classification label, where the classification label is used to indicate a salience detection algorithm for detecting a salient region of the test image; and detecting the salient region of the test image by using the salience detection algorithm indicated by the classification label, so as to obtain the salient region of the test image.

In a first possible implementation manner of the first aspect, before the performing classification processing on a test image according to an image feature vector of the test image by using a classifier obtained by means of pre-training, so as to obtain a classification label, the method further includes: extracting at least two image feature vectors of the test image by using at least two feature extraction algorithms.

With reference to the first possible implementation manner of the first aspect, in a second possible implementation manner, the at least two image feature vectors are at least two of the following image feature vectors: sparse weighted entropy, the number of colors in a derivative image, means and a variance of shifts of a one-dimensional spectrum graph of the test image respectively relative to each one-dimensional spectrum graph of images in a training set, an intermediate frequency ratio, and first moments of a hue H component, a saturation S component, and a value V component of an HSV space, and second moments of the H component, the S component, and the V component.

With reference to the second possible implementation manner of the first aspect, in a third possible implementation manner, the image feature vectors of the test image include the sparse weighted entropy, and the extracting at least two image feature vectors of the test image by using the feature extraction algorithms includes: downsampling filtering the test image inside an RGB color space; performing calculation on a downsampling filtered test image to obtain a color histogram vector of the downsampling filtered test image, where the color histogram vector includes n elements, n is a first number of colors included in the RGB color space of the downsampling filtered test image, and n is a natural number; calculating a sparse weighted coefficient $$s(X) = \frac{\sqrt{n} - \frac{\sum |x_i|}{\sqrt[q]{\sum x_i^q}}}{\sqrt{n} - 1},$$

where $x_i$ is the $i^{th}$ element in the color histogram vector, q is a preset value, and $q \geq 2$; and calculating the sparse weighted entropy $$SE(X) = \frac{s(X)}{e^{H(x)}},$$

where $e^{H(x)}$ is used to indicate entropy of the color histogram vector, $$H(X) = -\sum_{i=1}^{n} p(x_i) \log_b p(x_i),$$

$p(x_i)$ is the $i^{th}$ element in a normalized color histogram vector of the test image, and a value of b is 2, 10, or e.

With reference to the second possible implementation manner of the first aspect, in a fourth possible implementation manner, the image feature vectors of the test image include the number of colors in a derivative image, and the extracting at least two image feature vectors of the test image by using the feature extraction algorithms includes: determining a derivative image of the test image; downsampling filtering the derivative image inside an RGB color space; collecting statistics on a second number of colors included in the RGB color space of the downsampling filtered derivative image; and using the second number of colors as the number of colors in the derivative image.

With reference to the second possible implementation manner of the first aspect, in a fifth possible implementation manner, the image feature vectors of the test image include the means and the variance of shifts of the one-dimensional spectrum graph of the test image respectively relative to each one-dimensional spectrum graph of the images in the training set, and the extracting at least two image feature vectors of the test image by using the feature extraction algorithms includes: determining a one-dimensional spectrum graph of the test image; and comparing the one-dimensional spectrum graph of the test image with the one-dimensional spectrum graph of the image in the training set to obtain the means and the variance of shifts of the one-dimensional spectrum graph of the test image respectively relative to each one-dimensional spectrum graph of the images in the training set, where a frequency value of each frequency point in the one-dimensional spectrum graphs of the images in the training set is obtained by averaging frequency values of the frequency point in the one-dimensional spectrum graph of all training images, and the training images are used to train the classifier.

With reference to the second possible implementation manner of the first aspect, in a sixth possible implementation manner, the image feature vectors of the test image include the intermediate frequency ratio, and the extracting at least two image feature vectors of the test image by using the feature extraction algorithms includes: determining a two-dimensional spectrum graph of the test image, where the two-dimensional spectrum graph includes a horizontal frequency coordinate axis and a vertical frequency coordinate axis, the horizontal frequency coordinate axis includes m horizontal frequency bands, the vertical frequency coordinate axis includes m vertical frequency bands, and the frequency bands are sorted by frequency value; using frequency points within the $r^{th}$ to the $s^{th}$ horizontal frequency bands and the $r^{th}$ to the $s^{th}$ vertical frequency bands in the two-dimensional spectrum graph as intermediate frequency points, where $1<r<s<m$; and dividing a sum of frequency values of the intermediate frequency points by a sum of frequency values of frequency points within the m horizontal frequency bands and the m vertical frequency bands in the two-dimensional spectrum graph, so as to obtain the intermediate frequency ratio.

With reference to the second possible implementation manner of the first aspect, in a seventh possible implementation manner, the image feature vectors of the test image include the first moments of the H component, the S component, and the V component of the HSV space, and the second moments of the H component, the S component, and the V component, and the extracting at least two image feature vectors of the test image by using the feature extraction algorithms includes: performing calculation on the test image inside the HSV space to obtain the first moments of the H component, the S component, and the V component of the test image in the HSV space, and the second moments of the H component, the S component, and the V component of the test image in the HSV space.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, and the seventh possible implementation manner of the first aspect, in an eighth possible implementation manner, the classifier is a back propagation BP neural network.

With reference to the eighth possible implementation manner of the first aspect, in a ninth possible implementation manner, the BP neural network includes an input layer, an intermediate layer, and an output layer, where a transfer function between the input layer and the intermediate layer is a hyperbolic tangent sigmoid function, and a transfer function between the intermediate layer and the output layer is a logarithmic sigmoid function; and the performing classification processing on a test image according to an image feature vector of the test image by using a classifier obtained by means of pre-training, so as to obtain a classification label includes: performing, by using the BP neural network obtained by means of pre-training, classification processing on the test image according to an image feature vector, which is input by the input layer of the BP neural network, of the test image, and according to the hyperbolic tangent sigmoid function between the input layer of the BP neural network and the intermediate layer of the BP neural network and the logarithmic sigmoid function between the intermediate layer of the BP neural network and the output layer of the BP neural network, so as to obtain the classification label from the output layer of the BP neural network.

With reference to the first possible implementation manner of the first aspect, in a tenth possible implementation manner, before the extracting at least two image feature vectors of the test image by using at least two feature extraction algorithms, the method further includes: training the classifier by using image feature vectors of training images in a preset training set and based on the Levenberg-Marquardt LM learning algorithm, so that after the classification label is obtained by using the classifier, an error is the smallest in detecting, by using the salience detection algorithm indicated by the classification label, a salient region of an image in the training images.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, and the tenth possible implementation manner of the first aspect, in an eleventh possible implementation manner, the salience detection algorithm includes at least one of the following: frequency tuned FT, histogram-based contrast HC, local cues LC, and spectral residual SR.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, and the eleventh possible implementation manner of the first aspect, in a twelfth possible implementation manner, after the detecting a salient region of the test image by using the salience detection algorithm indicated by the classification label, so as to obtain the salient region, the method further includes performing screening processing on the salient region according to a preset screening policy.

A second aspect provides an apparatus for detecting a salient region of an image, including:

a classifying module, configured to perform classification processing on a test image according to an image feature vector of the test image by using a classifier obtained by means of pre-training, so as to obtain a classification label, where the classification label is used to indicate a salience detection algorithm for detecting a salient region of the test image; and a detecting module, configured to detect the salient region of the test image by using the salience detection algorithm indicated by the classification label, so as to obtain the salient region of the test image.

In a first possible implementation manner of the second aspect, the detecting apparatus further includes: an extracting module, configured to extract at least two image feature vectors of the test image by using at least two feature extraction algorithms.

With reference to the first possible implementation manner of the second aspect, in a second possible implementation manner, the extracting module is specifically configured to extract at least two of the following image feature vectors of the test image by using at least two feature extraction algorithms: sparse weighted entropy, the number of colors in a derivative image, means and a variance of shifts of a one-dimensional spectrum graph of the test image respectively relative to each one-dimensional spectrum graph of images in a training set, an intermediate frequency ratio, and first moments of a hue H component, a saturation S component, and a value V component of an HSV space, and second moments of the H component, the S component, and the V component.

With reference to the second possible implementation manner of the second aspect, in a third possible implementation manner, the image feature vectors of the test image include the sparse weighted entropy, and the extracting module is specifically configured to: downsampling filter the test image inside an RGB color space; perform calculation on the downsampling filtered test image to obtain a color histogram vector of the downsampling filtered test image, where the color histogram vector includes n elements, n is a first number of colors included in the RGB color space of the downsampling filtered test image, and n is a natural number; calculate a sparse weighted coefficient $$s(X) = \frac{\sqrt{n} - \frac{\sum |x_i|}{\sqrt[q]{\sum x_i^q}}}{\sqrt{n} - 1},$$

where $x_i$ is the $i^{th}$ element in the color histogram vector, q is a preset value, and q≥2; and calculate the sparse weighted entropy $$SE(X) = \frac{s(X)}{e^{H(x)}},$$

where $e^{H(x)}$ is used to indicate entropy of the color histogram vector, $$H(X) = -\sum_{i=1}^{n} p(x_i) \log_b p(x_i),$$

$p(x_i)$ is the $i^{th}$ element in a normalized color histogram vector of the test image, and a value of b is 2, 10, or e.

With reference to the second possible implementation manner of the second aspect, in a fourth possible implementation manner, the image feature vectors of the test image include the number of colors in a derivative image, and the extracting module is specifically configured to: determine a derivative image of the test image; downsampling filter the derivative image inside an RGB color space; collect statistics on a second number of colors included in the RGB color space of the downsampling filtered derivative image; and use the second number of colors as the number of colors in the derivative image.

With reference to the second possible implementation manner of the second aspect, in a fifth possible implementation manner, the image feature vectors of the test image include the means and the variance of shifts of the one-dimensional spectrum graph of the test image respectively relative to each one-dimensional spectrum graph of the images in the training set, and the extracting module is specifically configured to: determine a one-dimensional spectrum graph of the test image; and compare the one-dimensional spectrum graph of the test image with the one-dimensional spectrum graph of the image in the training set to obtain the means and the variance of shifts of the one-dimensional spectrum graph of the test image respectively relative to each one-dimensional spectrum graph of the images in the training set, where a frequency value of each frequency point in the one-dimensional spectrum graphs of the images in the training set is obtained by averaging frequency values of the frequency point in the one-dimensional spectrum graph of all training images, and the training images are used to train the classifier.

With reference to the second possible implementation manner of the second aspect, in a sixth possible implementation manner, the image feature vectors of the test image include the intermediate frequency ratio, and the extracting module is specifically configured to: determine a two-dimensional spectrum graph of the test image, where the two-dimensional spectrum graph includes a horizontal frequency coordinate axis and a vertical frequency coordinate axis, the horizontal frequency coordinate axis includes m horizontal frequency bands, the vertical frequency coordinate axis includes m vertical frequency bands, and the frequency bands are sorted by frequency value; use frequency points within the $r^{th}$ to the $s^{th}$ horizontal frequency bands and the $r^{th}$ to the $s^{th}$ vertical frequency bands in the two-dimensional spectrum graph as intermediate frequency points, where 1<r<s<m; and divide a sum of frequency values of the intermediate frequency points by a sum of frequency values of frequency points within the m horizontal frequency bands and the m vertical frequency bands in the two-dimensional spectrum graph, so as to obtain the intermediate frequency ratio.

With reference to the second possible implementation manner of the second aspect, in a seventh possible implementation manner, the image feature vectors of the test image include the first moments of the H component, the S component, and the V component of the HSV space, and the second moments of the H component, the S component, and the V component; and the extracting module is specifically configured to perform calculation on the test image inside the HSV space to obtain the first moments of the H component, the S component, and the V component of the test image in the HSV space, and the second moments of the H component, the S component, and the V component of the test image in the HSV space.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, and the seventh possible implementation manner of the second aspect, in an eighth possible implementation manner, the classifier is a back propagation BP neural network.

With reference to the eighth possible implementation manner of the second aspect, in a ninth possible implementation manner, the BP neural network includes an input layer, an intermediate layer, and an output layer, where a transfer function between the input layer and the intermediate layer is a hyperbolic tangent sigmoid function; and a transfer function between the intermediate layer and the output layer is a logarithmic sigmoid function; and the classifying module is specifically configured to perform, by using the BP neural network obtained by means of pre-training, classification processing on the test image according to an image feature vector, which is input by the input layer of the BP neural network, of the test image, according to the hyperbolic tangent sigmoid function between the input layer of the BP neural network and the intermediate layer of the BP neural network and the logarithmic sigmoid function between the intermediate layer of the BP neural network and the output layer of the BP neural network, so as to obtain the classification label from the output layer of the BP neural network.

With reference to the first possible implementation manner of the second aspect, in a tenth possible implementation manner, the detecting apparatus further includes: a training module, configured to train the classifier by using image feature vectors of training images in a preset training set and based on the Levenberg-Marquardt LM learning algorithm, so that after the classification label is obtained by using the classifier, an error is the smallest in detecting, by using the salience detection algorithm indicated by the classification label, a salient region of an image in the training images; and the classifying module is specifically configured to perform classification processing on the test image according to the image feature vector of the test image by using the classifier that is obtained after being pre-trained by the training module, so as to obtain the classification label.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, the ninth possible implementation manner of the second aspect, and the tenth possible implementation manner of the second aspect, in an eleventh possible implementation manner, the salience detection algorithm includes at least one of the following: frequency tuned FT, histogram-based contrast HC, local cues LC, and spectral residual SR.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, the ninth possible implementation manner of the second aspect, the tenth possible implementation manner of the second aspect, and the eleventh possible implementation manner of the second aspect, in a twelfth possible implementation manner, the detecting apparatus further includes: a screening module, configured to perform screening processing on the salient region according to a preset screening policy.

According to the method and apparatus for detecting a salient region of an image that are provided in embodiments of the present invention, classification processing is performed on a test image according to an image feature vector of the test image by using a classifier obtained by means of pre-training, so as to obtain a classification label; and then, a salient region of the test image is detected by using a salience detection algorithm indicated by the classification label, so as to obtain the salient region. Because the salience detection algorithm used in the embodiments of the present invention is obtained as a result of the processing, by the classifier, on the image feature vector of the test image, the salience detection algorithm is a detection algorithm that has the best detection effect for the test image among all salience detection algorithm sets. Therefore, using the method for detecting a salient region of an image in the embodiments of the present invention improves accuracy of salient region detection.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
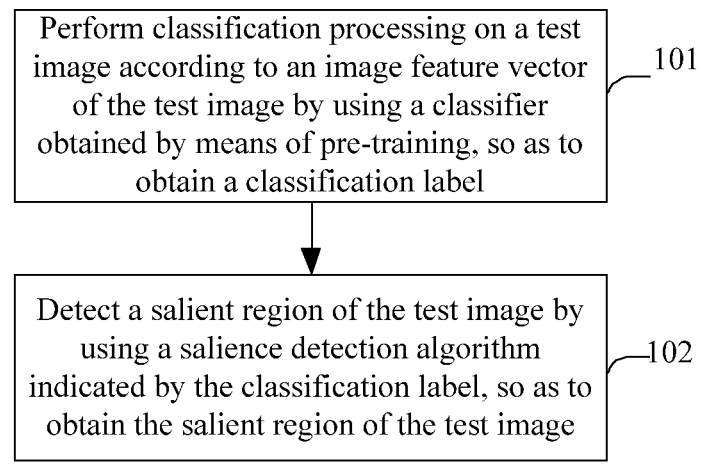
FIG. 1 is a schematic flowchart of a method for detecting a salient region of an image according to an embodiment of the present invention.

FIG. 1 is a schematic flowchart of a method for detecting a salient region of an image according to an embodiment of the present invention. Referring to FIG. 1, the embodiment includes:

101. Perform classification processing on a test image according to an image feature vector of the test image by using a classifier obtained by means of pre-training, so as to obtain a classification label.

The image feature vector is used to indicate an image feature, where the image feature includes but is not limited to at least one or a combination of a color feature, a textural feature, a shape feature, and a spatial relationship feature. The classification label is used to indicate a salience detection algorithm for detecting a salient region of the test image.

Optionally, the classifier may be a back propagation (Back Propagation, BP) neural network, which includes an input layer, an intermediate layer, and an output layer, where a transfer function between the input layer and the intermediate layer is a hyperbolic tangent sigmoid function, and a transfer function between the intermediate layer and the output layer is a logarithmic sigmoid function. A feature extraction algorithm is used to extract a feature from the test image to obtain the image feature vector of the test image. In this way, by using the BP neural network obtained by means of pre-training, classification processing is performed on the test image according to an image feature vector, which is input by the input layer of the BP neural network, of the test image, the hyperbolic tangent sigmoid function between the input layer of the BP neural network and the intermediate layer of the BP neural network, and the logarithmic sigmoid function between the intermediate layer of the BP neural network and the output layer of the BP neural network, so as to obtain the classification label from the output layer of the BP neural network.

Further, before step 101, the classifier is trained by using image feature vectors of training images in a preset training set and based on the Levenberg-Marquardt LM learning algorithm, so that after the classification label is obtained by using the classifier, an error is the smallest in detecting, by using the salience detection algorithm indicated by the classification label, a salient region of an image in the training images.

102. Detect a salient region of the test image by using a salience detection algorithm indicated by the classification label, so as to obtain the salient region of the test image.

The salience detection algorithm includes at least two of the following: frequency tuned (Frequency Tuned, FT), histogram-based contrast (Histogram-based contrast, HC), local cues (Local Cues, LC), and spectral residual (Spectral Residual, SR).

Optionally, if the indicated salience detection algorithm is the FT algorithm, where the algorithm is a representative salience detection algorithm, calculation is first performed on the test image to obtain an arithmetic mean $I_\mu$ of the image pixels, and then Gaussian blurring is performed on the test image to obtain $I_{\omega_{hc}}(x, y)$. An essence of the algorithm is to calculate the salient region by using a characteristic of intermediate filtering of the test image, where the salient region is $S(x, y)=\|I_\mu - I_{\omega_{hc}}(x, y)\|$.

Or, optionally, if the indicated salience detection algorithm is the HC algorithm, a histogram $$S(I_k) = S(c_l) = \sum_{j=1}^{n} f_j D(c_l, c_j)$$

of a LAB color space, that is, a color-opponent-color space, of the test image is first calculated, where $c_j$ is a value that is in the color space and corresponding to a pixel $I_k$ of the test image; n is the number of portions into which the color space is divided, and equivalent to a horizontal axis of the histogram; $f_j$ is a probability of a color $c_j$ in the histogram; and $D(c_i, c_j)$ is a distance between two colors in the color space and may be expressed by an Euclidean distance. Then, the color space is smoothed to obtain a weighted salient region $$S'(c) = \frac{1}{(m-1)T} \sum_{i=1}^{m} (T - D(c, c_i)) S(c_i),$$

where m=n/4 is the number of selected colors that have the closest color cluster, and $T=\sum_{i=1}^{m} D(c, c_i)$ is a sum of distances between a color c and m nearest colors of the color c. Apparently, a normalization factor $\sum_{i=1}^{m}(T-D(c,c_i))=(m-1)T$ can be obtained.

Or, optionally, if the indicated salience detection algorithm is the LC algorithm, where the LC algorithm can detect a salient region of a video. Here, for image data, we use only the spatial area detection part of the LC, where a principle of the spatial area detection part is that a color histogram of the test image is used as a feature for detecting the salient region. A difference between the LC and the HC lies in that the HC performs chunking and filtering processing on a raw color histogram.

Or, optionally, if the indicated salience detection algorithm is the SR algorithm, the test image is marked as I(x) and the following calculations are performed on I(x) successively: $A(f)=\Lambda(FFT[I(x)])$, $P(f)=\Omega(FFT[I(x)])$, $L(f)=\log(A(f))$, $R(f)=L(f)-h_n(f) \otimes L(f)$, $S(x)=g(x) \otimes IFFT[\exp(R(f)+P(f))]^2$, $$h_n(f) = \frac{1}{n^2} \begin{bmatrix} 1 & 1 & \cdots & 1 \\ 1 & 1 & \cdots & 1 \\ \cdots & \cdots & \cdots & \cdots \\ 1 & 1 & \cdots & 1 \end{bmatrix}, \text{ and } g(x) = \frac{1}{\sqrt{2\pi}\,\sigma} \exp\left(-\frac{x^2}{2\sigma^2}\right),$$

where FFT is Fourier transform, $\Lambda$ calculates an amplitude, A(f) is a magnitude spectrum of the test image, $\Omega$ calculates a phase, P(f) is a phase spectrum of the test image, L(f) is a magnitude spectrum under the logarithmic scale, $h_n(f)$ is mean filtering, and $\otimes$ is a convolution symbol; apparently, R(f) is a spectrum residual, IFFT is inverse Fourier transform, and g(x) is a standard Gaussian function; and the finally obtained salient region is S(x). An essence of the SR algorithm is to determine the spectrum residual by using a high frequency part of the test image as a salient region and using a statistical law that a frequency spectrum of a natural image conforms to 1/f distribution, so as to obtain a salient region.

Further, after step 102, screening processing may be performed, according to a preset screening policy, on salient regions obtained in step 102. That is, an unnecessary salient region is further screened out from the salient regions obtained in step 102, thereby improving accuracy of salience detection.

In the embodiment, classification processing is performed on a test image according to an image feature vector of the test image by using a classifier obtained by means of pre-training, so as to obtain a classification label; and then, a salient region of the test image is detected by using a salience detection algorithm indicated by the classification label, so as to obtain the salient region. Because the classification processing is performed on the test image, and the salient region of the test image is detected by using the salience detection algorithm corresponding to a classification to which the test image belongs, accuracy of salience detection is improved.

Figure 2A:
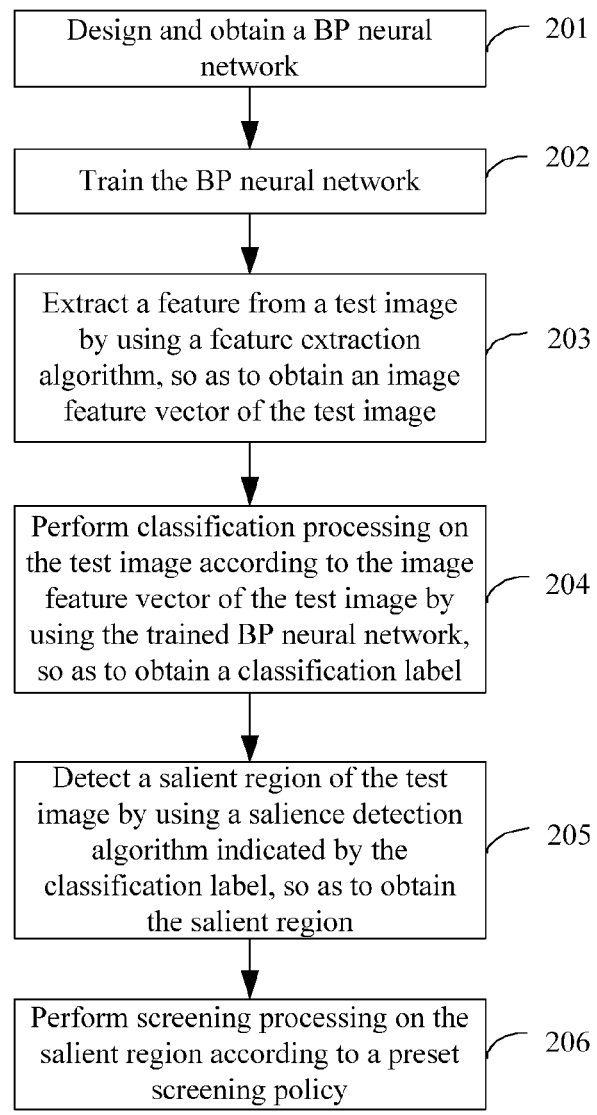
FIG. 2A is a schematic flowchart of a method for detecting a salient region of an image according to another embodiment of the present invention.

FIG. 2A is a schematic flowchart of a method for detecting a salient region of an image according to another embodiment of the present invention. Referring to FIG. 2A, the embodiment includes:

201. Design and obtain a BP neural network.

Figure 2B:
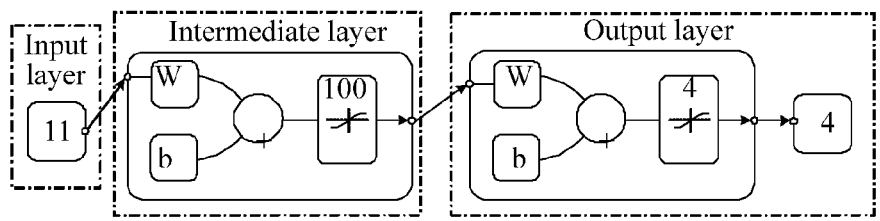
FIG. 2B is a schematic structural diagram of a BP neural network according to another embodiment of the present invention.

Optionally, the BP neural network includes an input layer, an intermediate layer, and an output layer. The input layer includes at least one first node, where the number of first nodes is the same as the number of image feature vectors of the test image. For example, FIG. 2B is a schematic structural diagram of a BP neural network according to another embodiment of the present invention, where W and b are parameters of the BP neural network, W is a weight, and b is an offset value. As shown in FIG. 2B, if the number of image feature vectors is 11, the number of first nodes at the input layer is 11. The intermediate layer includes at least one hidden neuron, for example, 100 hidden neurons. A transfer function between the input layer and the intermediate layer is a hyperbolic tangent sigmoid function. The output layer includes at least one second node, where one second node corresponds to one classification label. A transfer function between the intermediate layer and the output layer is a logarithmic sigmoid function. The classification label may be an output vector, where the output vector includes at least two elements. One node at the output layer of the BP neural network outputs one element of the output vector, and therefore, the number of elements included in the output vector is the same as the number of second nodes included at the output layer of the BP neural network. In the at least two elements included in the output vector, only one element is 1, and one or more other elements are 0. As shown in FIG. 2B, if the output layer of the BP neural network includes 4 second nodes, the output vector includes four elements, and there are four possibilities for a value of the output vector, which are (1,0,0,0), (0,1,0,0), (0,0,1,0), and (0,0,0,1) respectively. Each output vector among the four output vectors corresponds to one classification label, and each classification label corresponds to one salience detection algorithm. The embodiment relates to multi-classification, that is, the test image may be classified into at least two classifications. Therefore, a neural network is used as a classifier and may be designed directly from a second node at the output layer, thereby implementing multi-classification and reducing complexity of the classifier. In addition, the BP neural network in a neural network is specifically used mainly in consideration of a fact that the BP neural network does not generate a feedback and therefore is ease of calculation. In comparison with a feedforward neural network, not only network complexity is reduced, but also classification capability is stronger. In this way, when the BP neural network is used for classification processing, classification processing is performed on the test image according to an image feature vector, which is input by the input layer of the BP neural network, of the test image, the hyperbolic tangent sigmoid function between the input layer of the BP neural network and the intermediate layer of the BP neural network, and the logarithmic sigmoid function between the intermediate layer of the BP neural network and the output layer of the BP neural network, and finally a classification label is obtained from the output layer of the BP neural network.

202. Train the BP neural network.

Figure 2C:
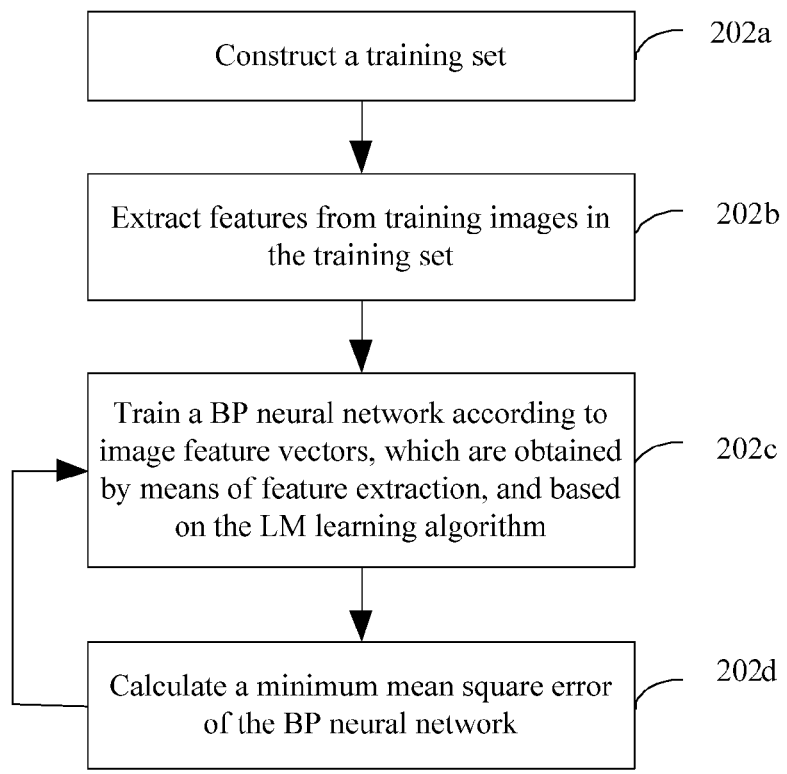
FIG. 2C is a schematic flowchart of training a BP neural network according to another embodiment of the present invention.

Specifically, FIG. 2C is a schematic flowchart of training a BP neural network according to another embodiment of the present invention. As shown in FIG. 2C, the method includes:

202a. Construct a training set.

Optionally, an image is selected from an international salience test base, for example, a salience test base Achanta1000, to construct the training set.

202b. Extract features from training images in the training set.

Optionally, the training images in the training set are divided into six groups. Feature extraction algorithms are used to extract features from the training images to obtain image feature vectors of the training images. There are at least two feature extraction algorithms. Therefore, at least two image feature vectors are obtained from the training images. The at least two image feature vectors are at least two of the following image feature vectors: sparse weighted entropy, the number of colors in a derivative image, means and a variance of shifts of a one-dimensional spectrum graph of the test image respectively relative to each one-dimensional spectrum graph of images in the training set, an intermediate frequency ratio, and first moments of a hue H component, a saturation S component, and a value V component of an HSV space, and second moments of the H component, the S component, and the V component.

202c. Train a BP neural network according to image feature vectors, which are obtained by means of feature extraction, and based on the Levenberg-Marquardt LM learning algorithm.

Optionally, by using the image feature vectors of the training images as input, using a six-fold cross validation method, and based on the Levenberg-Marquardt LM learning algorithm, the BP neural network is trained and a BP neural network parameter such as a weight or an offset is adjusted continuously.

202d. Calculate a minimum mean square error of the BP neural network.

Optionally, a training image is classified by using the BP neural network; after a classification label is obtained, a salient region of the training image is detected by using a salience detection algorithm indicated by the classification label; and a result of the salience detection is compared with a gold standard of the training image to obtain a minimum mean square error. For example, one of six groups is selected in turn as a test group, and the other five groups are used as training groups. After being trained by using the five training groups, the BP neural network is validated by using the test group. That is, the BP neural network is used for classification according to an image feature vector of a training image in the test group; after a classification label is obtained, a salient region is detected by using a salience detection algorithm indicated by the classification label; and an obtained result is compared with a gold standard of the training image to calculate a minimum mean square error.

Steps 202c and 202d are performed repeatedly in this way until the smallest minimum mean square error is obtained by means of calculation in 202d.

203. Extract a feature from a test image by using at least two feature extraction algorithms, so as to obtain at least two image feature vectors of the test image.

Optionally, the image feature vectors of the test image include the sparse weighted entropy. A calculation method of the sparse weighted entropy is as follows: Downsampling filtering are performed on an RGB color space of the test image; a color histogram vector of a downsampling filtered test image is calculated, where the color histogram vector includes n elements, and n is a first number of colors included in an RGB color space of the downsampling filtered test image, for example, if each color axis is divided into 64 equal portions, the number of colors in an entire RGB space is 64×64×64, that is, the obtained first number of colors included in the RGB color space of the downsampling filtered test image is 64×64×64; a sparse weighted coefficient $$s(x) = \frac{\sqrt{n} - \frac{\sum |x_i|}{\sqrt[q]{\sum x_i^q}}}{\sqrt{n} - 1}$$

is calculated, where $x_i$ is the $i^{th}$ element in the color histogram vector, q is a preset value, and q≥2; and the sparse weighted entropy $$SE(X) = \frac{s(X)}{e^{H(x)}}$$

is calculated, where $e^{H(x)}$ is used to indicate entropy of the color histogram vector, $$H(X) = -\sum_{i=1}^{n} p(x_i) \log_b p(x_i),$$

$p(x_i)$ is the $i^{th}$ element in a normalized color histogram vector of the test image, and a value of b is 2, 10, or e. A sparse weighted entropy obtained by using the foregoing method can be used to indicate that the test image is colorful or in only one color.

Optionally, the image feature vectors of the test image include the number of colors in a derivative image. A calculation method of the number of colors in a derivative image is as follows: A derivative image of the test image is determined; downsampling filtering are performed on an RGB color space of the derivative image, for example, if each color axis is divided into 64 equal portions, the number of colors in an entire RGB space is 64×64×64; a second number of colors is obtained, and the second number of colors is used as the number of colors in the derivative image. Because the derivative image is used for calculation, noises brought by a color gradient of a salient region are eliminated.

Figure 2D:
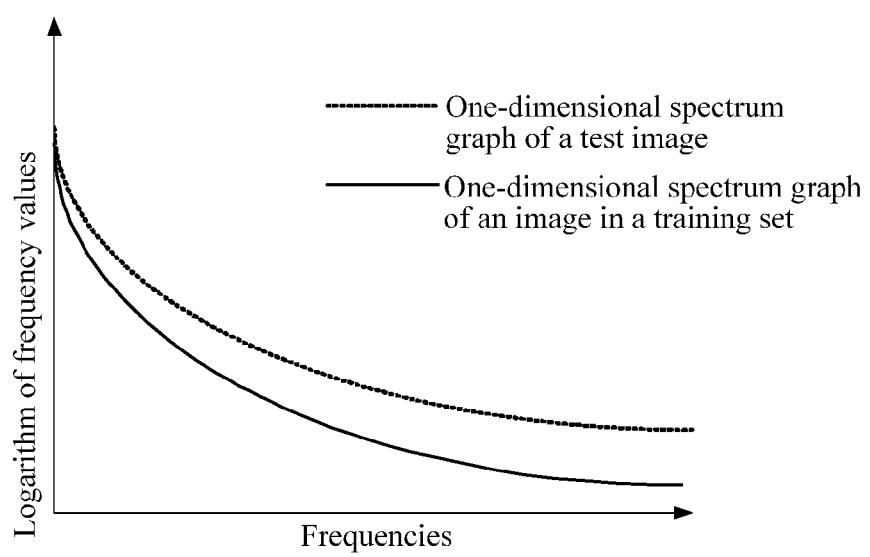
FIG. 2D is a diagram of a comparison between a one-dimensional spectrum graph of a test image and a one-dimensional spectrum graph of an image in a training set according to another embodiment of the present invention.

Optionally, the image feature vectors of the test image include the means and the variance of shifts of the one-dimensional spectrum graph of the test image respectively relative to each one-dimensional spectrum graph of the images in the training set. A calculation method of the means and the variance of shifts of the one-dimensional spectrum graph of the test image respectively relative to each one-dimensional spectrum graph of the images in the training set is as follows: The one-dimensional spectrum graph of the test image is determined by means of one-dimensional Fourier transform. FIG. 2D is a diagram of a comparison between a one-dimensional spectrum graph of a test image and one-dimensional spectrum graphs of images in a training set according to another embodiment of the present invention. As shown in FIG. 2, the one-dimensional spectrum graph of the test image is compared with the one-dimensional spectrum graphs of the images in the training set to obtain the means and the variance of shifts of the one-dimensional spectrum graph of the test image respectively relative to each one-dimensional spectrum graph of the images in the training set; and a frequency value of each frequency point in the one-dimensional spectrum graphs of the images in the training set is obtained by averaging frequency values of frequency points in one-dimensional spectrum graphs of all training images, where the training images are used to train the classifier.

Optionally, the image feature vectors of the test image include the intermediate frequency ratio. A calculation method of the intermediate frequency ratio is as follows: A two-dimensional spectrum graph of the test image is determined by means of two-dimensional Fourier transform, where the two-dimensional spectrum graph includes m horizontal frequency bands and m vertical frequency bands; the frequency bands are sorted by frequency value; frequency points within the $r^{th}$ to the $s^{th}$ horizontal frequency bands and the $r^{th}$ to the $s^{th}$ vertical frequency bands in the two-dimensional spectrum graph are used as intermediate frequency points, where 1<r<s<m; and a sum of frequency values of the intermediate frequency points is divided by a sum of frequency values of frequency points within the m horizontal frequency bands and the m vertical frequency bands in the two-dimensional spectrum graph to obtain the intermediate frequency ratio.

Optionally, the image feature vectors of the test image include the first moments of the H component, the S component, and the V component of the HSV space, and the second moments of the H component, the S component, and the V component. A calculation method of the first moments of the H component, the S component, and the V component of the HSV space, and the second moments of the H component, the S component, and the V component is as follows: The first moments of the hue H component, the saturation S component, and the value V component of the test image in the HSV space are calculated separately, and the second moments of the H component, the S component, and the V component of the test image in the HSV space are calculated separately.

It should be noted that, the foregoing feature extraction algorithms may be implemented separately, and may also be implemented in combination. The embodiment does not set a limitation thereto. For example, all of the sparse weighted entropy, the number of colors in a derivative image, the means and the variance of shifts of the one-dimensional spectrum graph of the test image respectively relative to each one-dimensional spectrum graph of the images in the training set, the intermediate frequency ratio, and the first moments of the hue H component, the saturation S component, and the value V component of the HSV space, and the second moments of the H component, the S component, and the V component, which are all obtained by means of calculation by using the foregoing algorithms, are used as an image feature vector, and therefore, the number of dimensions of the image feature vector is 11.

In addition, it should be noted that a feature extraction algorithm used for feature extraction of a test image is the same as a feature extraction algorithm used for feature extraction of a training image.

204. Perform classification processing on the test image according to the image feature vector of the test image by using the trained BP neural network, so as to obtain a classification label.

Optionally, by using the image feature vectors of the test image as input to the BP neural network, using the trained BP neural network, and according to the image feature vectors of the test image, classification processing is performed on the test image to obtain the classification label.

205. Detect a salient region of the test image by using a salience detection algorithm indicated by the classification label, so as to obtain the salient region.

Optionally, after the detecting a salient region of the test image by using a salience detection algorithm indicated by the classification label, regions and a salience value of each region are obtained, and a region with a salience value exceeding a threshold is used as the salient region.

206. Perform screening processing on the salient region according to a preset screening policy.

The screening policy includes the following: If a ratio of an area of a salient region with the highest salience value to an area of one or more other salient regions is greater than a preset threshold a, the salient region with the highest salience value is screened out; if a ratio of a transverse width of a salient region to a transverse width of a test image is greater than a preset threshold b, the salient region is screened out; if a salient region does not include a point with the highest salience value, the point with the highest salience value is screened out, where the region includes multiple points; if a ratio of an area of an external rectangle of a salient region to an area of a test image is greater than a preset threshold c, the salient region is screened out; and if a value of an H component in an HSV color space of a salient region is between a preset upper limit d and a preset lower limit e, and a value of an S component is between a preset upper limit f and a preset lower limit g, the inner part of the salient region is determined as the sky, and the salient region is screened out.

Further, screening processing is performed on an obtained salient region according to the preset screening policy. Therefore, after an unnecessary salient region in the salient region is screened out, a salient region that has undergone the screening processing is marked in the test image. Because the foregoing screening processing is adopted, an error is further decreased in salient region detection.

In the embodiment, classification processing is performed on a test image according to an image feature vector of the test image by using a classifier obtained by means of pre-training, so as to obtain a classification label; and further, a salient region of the test image is detected by using a salience detection algorithm indicated by the classification label, so as to obtain the salient region. Because classification processing is performed on the test image, and the salient region of the test image is detected by using the salience detection algorithm corresponding to a classification to which the test image belongs, accuracy of salient region detection is improved. In addition, because the feature extraction algorithm and the salience detection algorithm are adopted, efficiency of salient region detection is improved, and a calculation overhead that is required by most high-complexity salience detection algorithms which are selected generally for guaranteeing detection quality, is reduced in salient region detection. Therefore, this method is more applicable to mobile phones, set top boxes, or the like, which have relatively limited resources.

Figure 3:
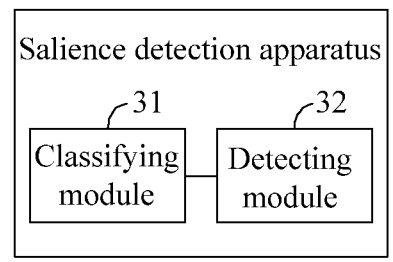
FIG. 3 is a schematic structural diagram of an apparatus for detecting a salient region of an image according to an embodiment of the present invention.

FIG. 3 is a schematic structural diagram of an apparatus for detecting a salient region of an image according to an embodiment of the present invention. Referring to FIG. 3, the embodiment includes: a classifying module 31 and a detecting module 32.

The classifying module 31 is configured to perform classification processing on a test image according to an image feature vector of the test image by using a classifier obtained by means of pre-training, so as to obtain a classification label.

The classification label is used to indicate the salience detection algorithm for detecting a salient region of the test image. The classifier is a back propagation BP neural network, which includes an input layer, an intermediate layer, and an output layer, where a transfer function between the input layer and the intermediate layer is a hyperbolic tangent sigmoid function, and a transfer function between the intermediate layer and the output layer is a logarithmic sigmoid function.

Optionally, the classifying module 31 is specifically configured to perform, by using the BP neural network obtained by means of pre-training, classification processing on the test image according to an image feature vector, which is input by the input layer of the BP neural network, of the test image, according to the hyperbolic tangent sigmoid function between the input layer of the BP neural network and the intermediate layer of the BP neural network and the logarithmic sigmoid function between the intermediate layer of the BP neural network and the output layer of the BP neural network, so as to obtain the classification label from the output layer of the BP neural network.

The detecting module 32, connected to the classifying module 31, is configured to detect a salient region of the test image by using the salience detection algorithm indicated by the classification label, so as to obtain the salient region.

The salience detection algorithm includes at least two of the following: frequency tuned, histogram-based contrast, local cues, and spectral residual.

In the embodiment, classification processing is performed on a test image according to an image feature vector of the test image by using a classifier obtained by means of pre-training, so as to obtain a classification label; and further, a salient region of the test image is detected by using a salience detection algorithm indicated by the classification label, so as to obtain the salient region. Because the classification processing is performed on the test image, and the salient region of the test image is detected by using the salience detection algorithm indicated by a classification to which the test image belongs, accuracy of salient region detection is improved.

Figure 4:
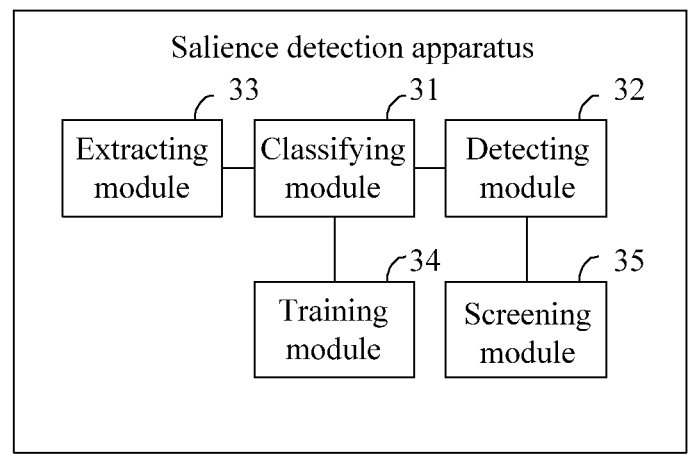
FIG. 4 is a schematic structural diagram of an apparatus for detecting a salient region of an image according to another embodiment of the present invention.

FIG. 4 is a schematic structural diagram of an apparatus for detecting a salient region of an image according to another embodiment of the present invention. As shown in FIG. 4, on the basis of the foregoing embodiment, the detection apparatus in this embodiment further includes:

an extracting module 33, connected to the classifying module 31 and configured to extract at least two image feature vectors of the test image by using at least two feature extraction algorithms.

The at least two image feature vectors are at least two of the following image feature vectors: sparse weighted entropy, the number of colors in a derivative image, means and a variance of shifts of a one-dimensional spectrum graph of the test image respectively relative to each one-dimensional spectrum graph of images in a training set, an intermediate frequency ratio, and first moments of a hue H component, a saturation S component, and a value V component of an HSV space, and second moments of the H component, the S component, and the V component.

Optionally, the extracting module 33 is specifically configured to extract at least two of the following image feature vectors of the test image by using at least two feature extraction algorithms: sparse weighted entropy, the number of colors in a derivative image, means and a variance of shifts of a one-dimensional spectrum graph of the test image respectively relative to each one-dimensional spectrum graph of images in a training set, an intermediate frequency ratio, and first moments of a hue H component, a saturation S component, and a value V component of an HSV space, and second moments of the H component, the S component, and the V component.

In view of this, if the image feature vectors of the test image include the sparse weighted entropy, the extracting module 33 is specifically configured to: downsampling filter the test image inside an RGB color space; perform calculation on the downsampling filtered test image to obtain a color histogram vector of the downsampling filtered test image, where the color histogram vector includes n elements, n is a first number of colors included in the RGB color space of the downsampling filtered test image, and n is a natural number; calculate a sparse weighted coefficient $$s(X) = \frac{\sqrt{n} - \frac{\sum |x_i|}{\sqrt[q]{\sum x_i^q}}}{\sqrt{n} - 1},$$

where $x_i$ is the $i^{th}$ element in the color histogram vector, q is a preset value, and $q \geq 2$; and calculate the sparse weighted entropy $$SE(X) = \frac{s(X)}{e^{H(x)}},$$

where $e^{H(x)}$ is used to indicate entropy of the color histogram vector, $$H(X) = -\sum_{i=1}^{n} p(x_i) \log_b p(x_i),$$

$p(x_i)$ is the $i^{th}$ element in a normalized color histogram vector of the test image, and a value of b is 2, 10, or e.

Optionally, if the image feature vectors of the test image include the number of colors in a derivative image, the extracting module 33 is specifically configured to: determine a derivative image of the test image; downsampling filter the derivative image inside an RGB color space; collect statistics on a second number of colors included in an RGB color space of a downsampling filtered derivative image; and use the second number of colors as the number of colors in the derivative image.

Optionally, if the image feature vectors of the test image include the means and the variance of shifts of the one-dimensional spectrum graph of the test image respectively relative to each one-dimensional spectrum graph of the images in the training set, the extracting module 33 is specifically configured to: determine a one-dimensional spectrum graph of the test image; and compare the one-dimensional spectrum graph of the test image with the one-dimensional spectrum graphs of the images in the training set to obtain the means and the variance of shifts of the one-dimensional spectrum graph of the test image respectively relative to each one-dimensional spectrum graph of the images in the training set, where a frequency value of each frequency point in the one-dimensional spectrum graphs of the images in the training set is obtained by averaging frequency values of frequency points in one-dimensional spectrum graphs of all training images; and the training images are used to train the classifier.

Optionally, if the image feature vectors of the test image include the intermediate frequency ratio, the extracting module 33 is specifically configured to: determine a two-dimensional spectrum graph of the test image, where the two-dimensional spectrum graph includes a horizontal frequency coordinate axis and a vertical frequency coordinate axis, the horizontal frequency coordinate axis includes m horizontal frequency bands, the vertical frequency coordinate axis includes m vertical frequency bands, and the frequency bands are sorted by frequency value; use frequency points within the $r^{th}$ to the $s^{th}$ horizontal frequency bands and the $r^{th}$ to the $s^{th}$ vertical frequency bands in the two-dimensional spectrum graph as intermediate frequency points, where $1 < r \leq s < m$; and divide a sum of frequency values of the intermediate frequency points by a sum of frequency values of frequency points within the m horizontal frequency bands and the m vertical frequency bands in the two-dimensional spectrum graph, so as to obtain the intermediate frequency ratio.

Optionally, if the image feature vectors of the test image include the first moments of the H component, the S component, and the V component of the HSV space, and the second moments of the H component, the S component, and the V component, the extracting module 33 is specifically configured to perform calculation on the test image inside the HSV space to obtain the first moments of the H component, the S component, and the V component of the test image in the HSV space, and the second moments of the H component, the S component, and the V component of the test image in the HSV space.

Further, the salience detection apparatus further includes a training module 34 and a screening module 35.

The training module 34, connected to the classifying module 31, is configured to train the classifier by using image feature vectors of training images in a preset training set and based on the Levenberg-Marquardt LM learning algorithm, so that after the classification label is obtained by using the classified, an error is the smallest in performing, by using the salience detection algorithm indicated by the classification label, salience detection on the training images.

The screening module 35, connected to the detecting module 32, is configured to perform screening processing on the salient region according to a preset screening policy.

In the embodiment, classification processing is performed on a test image according to an image feature vector of the test image by using a classifier obtained by means of pre-training, so as to obtain a classification label; and further, a salient region of the test image is detected by using a salience detection algorithm indicated by the classification label, so as to obtain the salient region. Because the classification processing is performed on the test image, and the salient region of the test image is detected by using the salience detection algorithm corresponding to a classification to which the test image belongs, accuracy of salient region detection is improved. In addition, because the feature extraction algorithm and the salience detection algorithm are adopted, efficiency of salient region detection is improved, and a calculation overhead required for salience detection is reduced. Therefore, this method is more applicable to mobile phones, set top boxes, or the like, which have relatively limited calculation resources.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for detecting a salient region of an image, comprising:

performing classification processing on a test image according to an image feature vector of the test image using a classifier obtained by pre-training, so as to obtain a classification label, wherein the classification label is used to indicate a salience detection algorithm for detecting a salient region of the test image, wherein the classifier is a back propagation (BP) neural network, wherein the BP neural network comprises an input layer, an intermediate layer, and an output layer, wherein a transfer function between the input layer and the intermediate layer is a hyperbolic tangent sigmoid function, wherein performing the classification processing on the test image comprises:

performing, by using the BP neural network obtained by pre-training, classification processing on the test image according to the image feature vector, which is input by the input layer of the BP neural network, of the test image, and according to the hyperbolic tangent sigmoid function between the input layer of the BP neural network and the intermediate layer of the BP neural network and the logarithmic sigmoid function between the intermediate layer of the BP neural network and the output layer of the BP neural network, so as to obtain the classification label from the output layer of the BP neural network; and detecting the salient region of the test image by using the salience detection algorithm indicated by the classification label, so as to obtain the salient region of the test image.

2. The method according to claim 1, wherein before performing the classification processing on the test image comprises:

extracting at least two image feature vectors of the test image by using at least two feature extraction algorithms.

3. The method according to claim 2, wherein the at least two image feature vectors are at least two of the following image feature vectors:

sparse weighted entropy, a number of colors in a derivative image, means and a variance of shifts of a one-dimensional spectrum graph of the test image respectively relative to each one-dimensional spectrum graph of images in a training set, an intermediate frequency ratio, and first moments of a hue (H) component, a saturation is (S) component, and a value (V) component of an HSV space, and second moments of the H component, the S component, and the V component.

4. The method according to claim 1, wherein after the detecting the salient region of the test image using the salience detection algorithm indicated by the classification label, so as to obtain the salient region, the method further comprises:

performing screening processing on the salient region according to a preset screening policy.

5. A method for detecting a salient region of an image, the method comprising:

training a classifier by using image feature vectors of training images in a preset training set and based on the Levenberg-Marquardt (LM) learning algorithm, so that after a classification label is obtained by using the classifier, an error is the smallest in detecting, by using the salience detection algorithm indicated by the classification label, a salient region of an image in the training images;

extracting at least two image feature vectors of a test image by using at least two feature extraction algorithms;

performing classification processing on the test image according to an image feature vector of the at least two image feature vectors of the test image using the classifier obtained by pre-training, so as to obtain the classification label, wherein the classification label is used to indicate a salience detection algorithm for detecting a salient region of the test image, wherein the salience detection algorithm includes at least two of: frequency tuned (FT), histogram-based contrast (HC), local cues (LC), or spectral residual (SR); and detecting the salient region of the test image by using the salience detection algorithm indicated by the classification label, so as to obtain the salient region of the test image.

6. An apparatus for detecting a salient region of an image, comprising at least one hardware processor coupled to a memory programmed with executable instructions that, when executed by the at least one hardware processor, cause the apparatus to perform the following functionality, comprising:

a classifying module, configured to perform classification processing on a test image according to an image feature vector of the test image using a classifier obtained by pre-training, so as to obtain a classification label, wherein the classification label is used to indicate a salience detection algorithm for detecting a salient region of the test image, wherein the salience detection algorithm includes at least two of: frequency tuned (FT), histogram-based contrast (HC), local cues (LC), or spectral residual (SR), wherein the classifier is a back propagation (BP) neural network, wherein the BP neural network comprises an input layer, an intermediate layer, and an output layer, wherein a transfer function between the input layer and the intermediate layer is a hyperbolic tangent sigmoid function, and a transfer function between the intermediate layer and the output layer is a logarithmic sigmoid function;

the classifying module is further configured to perform, using the BP neural network obtained by pre-training, classification processing on the test image according to an image feature vector, which is input by the input layer of the BP neural network, of the test image, according to the hyperbolic tangent sigmoid function between the input layer of the BP neural network and the intermediate layer of the BP neural network and the logarithmic sigmoid function between the intermediate layer of the BP neural network and the output layer of the BP neural network, so as to obtain the classification label from the output layer of the BP neural network; and a detecting module, configured to detect the salient region of the test image by using the salience detection algorithm indicated by the classification label, so as to obtain the salient region of the test image.

7. The apparatus for detecting a salient region of an image according to claim 6, further comprising:

an extracting module, configured to extract at least two image feature vectors of the test image by using at least two feature extraction algorithms.

8. The apparatus for detecting a salient region of an image according to claim 7, wherein the extracting module is configured to extract at least two of the following image feature vectors of the test image by using at least two feature extraction algorithms:

sparse weighted entropy, a number of colors in a derivative image, means and a variance of shifts of a one-dimensional spectrum graph of the test image respectively relative to each one-dimensional spectrum graph of images in a training set, an intermediate frequency ratio, and first moments of a hue (H) component, a saturation is (S) component, and a value (V) component of an HSV space, and second moments of the H component, the S component, and the V component.

9. The apparatus for detecting a salient region of an image according to claim 7, further comprising:

a training module, configured to train the classifier by using image feature vectors of training images in a preset training set and based on the Levenberg-Marquardt (LM) learning algorithm, so that after the classification label is obtained by using the classifier, an error is the smallest in detecting, by using the salience detection algorithm indicated by the classification label, a salient region of an image in the training images; and the classifying module is configured to perform classification processing on the test image according to the image feature vector of the test image by using the classifier that is obtained after being pre-trained by the training module, so as to obtain the classification label.

10. The apparatus for detecting a salient region of an image according to claim 6, further comprising:

a screening module, configured to perform screening processing on the salient region according to a preset screening policy.

11. A non-transitory computer readable medium, programmed with executable instructions that, when executed by hardware comprising a processing system, performs operations comprising:

performing classification processing on a test image according to an image feature vector of the test image using a classifier obtained by pre-training, so as to obtain a classification label, wherein the classification label is used to indicate a salience detection algorithm for detecting a salient region of the test image, wherein the salience detection algorithm includes at least two of: frequency tuned (FT), histogram-based contrast (HC), local cues (LC), or spectral residual (SR), wherein the classifier is a back propagation (BP) neural network, wherein the BP neural network comprises an input layer, an intermediate layer, and an output layer, wherein a transfer function between the input layer and the intermediate layer is a hyperbolic tangent sigmoid function, wherein performing the classification processing on the test image comprises:

performing, by using the BP neural network obtained by pre-training, classification processing on the test image according to the image feature vector, which is input by the input layer of the BP neural network, of the test image, and according to the hyperbolic tangent sigmoid function between the input layer of the BP neural network and the intermediate layer of the BP neural network and the logarithmic sigmoid function between the intermediate layer of the BP neural network and the output layer of the BP neural network, so as to obtain the classification label from the output layer of the BP neural network; and detecting the salient region of the test image by using the salience detection algorithm indicated by the classification label, so as to obtain the salient region of the test image.

12. The medium according to claim 11, wherein before performing the classification processing on the test image comprises:

extracting at least two image feature vectors of the test image by using at least two feature extraction algorithms.

13. The medium according to claim 12 wherein the at least two image feature vectors are at least two of the following image feature vectors:

sparse weighted entropy, a number of colors in a derivative image, means and a variance of shifts of a one-dimensional spectrum graph of the test image respectively relative to each one-dimensional spectrum graph of images in a training set, an intermediate frequency ratio, and first moments of a hue (H) component, a saturation is (S) component, and a value (V) component of an HSV space, and second moments of the H component, the S component, and the V component.

14. The medium according to claim 12, wherein before the extracting at least two image feature vectors of the test image by using at least two feature extraction algorithms, the method further comprises:

training the classifier by using image feature vectors of training images in a preset training set and based on the Levenberg-Marquardt (LM) learning algorithm, so that after the classification label is obtained by using the classifier, an error is the smallest in detecting, by using the salience detection algorithm indicated by the classification label, a salient region of an image in the training images.

15. The medium according to claim 11, wherein after the detecting the salient region of the test image using the salience detection algorithm indicated by the classification label, so as to obtain the salient region, the method further comprises:

performing screening processing on the salient region according to a preset screening policy.

* * * * *